United States Patent [19]
Havemann et al.

[11] Patent Number: 5,509,495
[45] Date of Patent: Apr. 23, 1996

[54] DRIVE ASSEMBLY FOR MOTOR VEHICLES

[75] Inventors: Kim Havemann, Weissach; Rolf von Sivers, Rutesheim; Ulrich Layher, Sersheim; Clemens Mutter, Keltern-Weiler; Bernd Wacker, Weissach, all of Germany

[73] Assignee: Dr. Ing. h.c.F. Porsche AG, Weissach, Germany

[21] Appl. No.: 94,124

[22] PCT Filed: Dec. 3, 1991

[86] PCT No.: PCT/EP91/02297

§ 371 Date: Jul. 30, 1993

§ 102(e) Date: Jul. 30, 1993

[87] PCT Pub. No.: WO92/13734

PCT Pub. Date: Aug. 20, 1992

[30] Foreign Application Priority Data

Jan. 30, 1991 [WO] WIPO .............. PCT/EP91/00167
Sep. 19, 1991 [DE] Germany .............. 41 31 163.9

[51] Int. Cl.⁶ .................................................. B60K 20/00
[52] U.S. Cl. .......................... 180/291; 180/293; 180/380
[58] Field of Search ................................. 180/291, 292, 180/293, 299, 300, 380, 381

[56] References Cited

U.S. PATENT DOCUMENTS

| | | | |
|---|---|---|---|
| 1,918,490 | 7/1933 | Riley | 180/292 |
| 2,328,518 | 8/1943 | Wahlberg et al. | 180/292 |
| 2,716,461 | 8/1955 | MacPherson | 180/292 |
| 2,756,835 | 7/1956 | Müller | 180/292 |
| 3,089,559 | 5/1963 | Rieck | 180/292 |
| 3,219,138 | 11/1965 | Kishline | 180/292 |
| 4,610,327 | 9/1988 | Orain | 180/380 |
| 4,709,778 | 1/1987 | von Sivers | 180/292 |
| 5,267,623 | 12/1993 | Kashiwaghi | 180/380 |
| 5,351,782 | 10/1994 | Kameda | 180/292 |

FOREIGN PATENT DOCUMENTS

| | | |
|---|---|---|
| 0005839 | 12/1979 | European Pat. Off. . |
| 0115232 | 8/1984 | European Pat. Off. . |
| 2469311 | 5/1981 | France . |
| 682786 | 10/1939 | Germany . |
| 3044288 | 6/1982 | Germany . |
| 3331580 | 3/1985 | Germany . |
| 3417227 | 11/1985 | Germany . |
| 507497 | 6/1939 | United Kingdom . |
| 972754 | 10/1964 | United Kingdom . |
| 2096952 | 10/1982 | United Kingdom . |

*Primary Examiner*—Richard M. Camby
*Attorney, Agent, or Firm*—Evenson McKeown Edwards & Lenahan

[57] ABSTRACT

A drive assembly for a motor vehicle comprising a forward engine supported in two bearings on the vehicle body, a rearward drive unit supported by way of at least one elastic bearing, and a central support tube arranged in-between. This central support tube is connected on the forward end with the engine in a movable manner and on the rearward end with the drive unit in a rigid manner. A drive shaft or a central corrugated shaft which has a torque-transmitting joint in the area of the connection extends in the central support tube. The engine is connected with the drive unit by way of an uncoupling device which can be adapted as a function of main excitation directions of the engine and which comprises a connecting joint which holds the engine so that it can be angular moved in the main excitation directions. The connecting joint and/or a bearing device is used for the torque support. As a result, a drive assembly is provided which ensures a targeted uncoupling of vibrations of the engine caused by unbalanced forces of inertia and moments of inertia, with respect to the remaining drive assembly.

8 Claims, 8 Drawing Sheets

DRIVE ASSEMBLY FOR MOTOR VEHICLES

BACKGROUND AND SUMMARY OF THE INVENTION

The present invention relates to a drive assembly for a motor vehicle comprising a forward engine supported in bearings on the vehicle body, a rearward drive unit supported by way of at least one elastic bearing, and a central support tube arranged in-between which is connected on the forward end with the engine in a movable manner and on the rearward end with the drive unit in a rigid manner, and in which a drive shaft extends which has a torque-transmitting joint in the area of its connection to the clutch shaft.

From German Patent Document DE-PS 34 17 227, a drive assembly for a motor vehicle is known which comprises a forward engine and a rearward transmission, and these units are connected by way of a center tube. Inside the tube, a drive shaft is arranged which establishes a driving connection between the engine and the transmission. In order to avoid the transmitting of low-frequency vibrations from the engine to the transmission, particularly when driving over bumps or the like, a torsionally rigid and thin-walled corrugated metal tube is used which, however, cannot be designed in a targeted manner with respect to the main excitation directions of the engine but represents an articulated connection.

It is an object of the invention to provide a drive assembly which ensures a targeted uncoupling of vibrations of the engine, particularly high-frequency vibrations caused by unbalanced forces of inertia and moments of inertia, with respect to the remaining drive assembly.

This and other objects are achieved by the present invention which provides a drive assembly for a motor vehicle comprising a forward engine supported in bearings on the vehicle body, a rearward drive unit supported by way of at least one elastic bearing, and a central support tube arranged in-between which is connected on the forward end with the engine in a movable manner and on the rearward end with the drive unit in a rigid manner, and in which a drive shaft extends which has a torque-transmitting joint in the area of its connection to the clutch shaft, wherein the engine is connected with the drive unit by way of a vibration uncoupling device which can be adapted as a function of main excitation directions of the engine in the circular direction in the vertical Z-direction and in the transverse Y-direction, and which comprises a connecting joint which holds the engine so that it can be angularly moved in main excitation directions, and the connecting joint and/or a bearing device is used for the torque support of the drive unit, the bearings of the engine and of the drive unit being arranged in vibration nodes of the natural vibrations of the assembly and a largest possible supporting base with the distance existing between the bearings of the drive unit in an elastic bearing on the central support tube, the bearing being arranged on the joint part of the central support tube.

The principal advantages achieved by means of the invention are that the disadvantages of the central support tube concept with respect to the excitation of vibrations are avoided, but at the same time, the advantages which are typical of the central support tube are maintained. These consist particularly of a low number of bearing points of the assembly in the vehicle and of a large supporting base for the wheel drive torques.

Pronounced bending and torsional resonances of the overall assembly which are preferably excited by the engine usually occur in the operating rotational speed range. In order to avoid these resonances, the assembly is divided into two vibration systems in such a manner that the engine is uncoupled by means of an uncoupling device, such as a connecting joint, from the remaining assembly, such as the transmission with the connected central support tube. This device or this joint must be coordinated in such a manner that the main excitation directions or planes of the engine in the vertical and transverse direction as well as during wobbling excitations are taken into account.

Thus, according to the construction of the engine and its main excitation directions, a joint may advantageously be inserted by means of which a torsionally rigid uncoupling is achieved that is free of bending moments, either in a Y-plane or in a Z-plane. Another embodiment contains a joint which causes a torsionally rigid uncoupling that is free of bending moments simultaneously in a Z-plane and a Y-plane. A construction of a joint, such as an elastic ring, is also possible by means of which an uncoupling is achieved which is torsionally soft and free of bending moments.

In the case of a torsionally soft uncoupling of the engine, a vehicle-body-side support by way of two bearings arranged on a console is required for the supporting of the engine driving torques in the area of the transmission.

The connecting joint should be arranged as close to the engine as possible in order to avoid large paths on the joint when the engine is moved. Also, an additional bearing should be arranged on the central support tube which has a base to the rear bearing of the transmission that is as large as possible.

According to the requirements, the connecting joint may be an O-seal, an elastomer preform or a flexible disk.

The articulated connecting of the central support tube by means of an O-seal made of an elastomer material takes place in such a manner that the ring is inserted in a connecting flange of a bell housing which centers in a flange-free manner the central support tube by way of the inside diameter.

According to another embodiment, the connecting joint may also be constructed as a spherical plain bearing comprising an outer ring and an inner ring which each have arched slide faces and permit a wobbling motion of the engine caused by free inertial forces to the central support tube with the connected transmission.

As a result, the bearing points of the transmission are largely kept free of bending vibrations. The spherical plain bearing is constructed in such a manner that it is radially without play but can transmit axial forces and is constructed to be extremely free of friction.

The arrangement of the spherical plain bearing is provided at the free end of the central support tube which faces the engine, the inner ring being held in a receiving device which is connected with the central support tube. This receiving device may consist either of a sleeve which can be fitted onto the tube or of a lengthened tube part.

At the end, the exterior tube is supported on the clutch housing and is held by a tensioning ring which is connected with a clutch housing. So that the bearing arrangements on the inner ring can be carried out in a simple manner, this inner ring has longitudinal slots which permit a sliding onto the arched slide face of the inner ring.

A rubber O-seal inserted in a groove on the outer ring of the bearing prevents by means of its prestressing a rattling play in the housing parts. Furthermore, it achieves that freedom from play is obtained in the bearing during its whole service life.

In the case of a crash at low speed, a transmission of forces from the engine by way of the joint and the support bearing/cross member to the vehicle floor is supported without any damage to the bearing.

The pairing of materials on the inner and outer ring is selected such that the outer ring consists of plastic slides on a chromium layer of the metallic inner ring. The connection of the drive shaft guided through in the central support tube or of a central shaft tube with the engine-side output shaft takes place, for example, by way of a spirally toothed end of the shaft which engages in a corresponding toothing in a sleeve of the output shaft.

Other solutions of the connection between the output shaft and the central shaft may consist of a constant-velocity joint or an elastomer disk.

Advantageously, the torque-transmitting joint, particularly a cardan joint, is provided with a centric opening. As a result, it becomes possible to shift the clutch shaft from a drive position into a repair position axially in the central shaft tube so that a fast removal of the clutch can take place.

In order to achieve an effective uncoupling of vibrations between the engine and the transmission with a rigidly connected central support tube, the central support tube must be light and resistant to bending, in which case a reduced torsional rigidity and a high resistance to bending is desirable. A central support tube made of a fiber composite material is suitable for this purpose.

Because of the low excitation of vibrations, the articulated connection to the central support tube or to the drive shaft must be arranged as closely as possible to the engine. Furthermore, the bearing sites of the drive shaft must be fixed in the area of a low excitation of the central support tube.

Other objects, advantages and novel features of the present invention will become apparent from the following detailed description of the invention when considered in conjunction with the accompanying drawings.

DETAILED DESCRIPTION OF THE DRAWINGS

Figure 1:
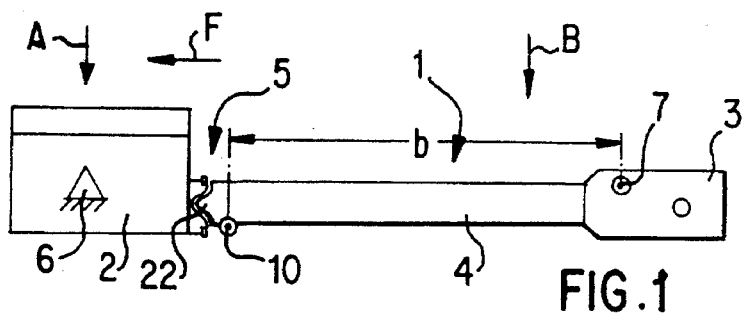
FIG. 1 is a view of a drive assembly having a central support tube which connects the engine with the transmission constructed in accordance with an embodiment of the present invention.

The drive assembly 1 comprises essentially a forward engine 2 with a housing neck or a clutch housing 50 and a rearward drive unit 3 as well as a central support tube 4 which is fixedly connected with it and which is connected with the engine 2 by way of an uncoupling device 5. The engine 2 is supported on the vehicle body by way of at least two bearings 6, and the drive unit 3, 4 is supported on the vehicle body by way of at least one bearing 7. Another bearing 10 may be provided on the central support tube 4 or on the engine 2, as illustrated in detail in FIG. 1.

Figure 2:
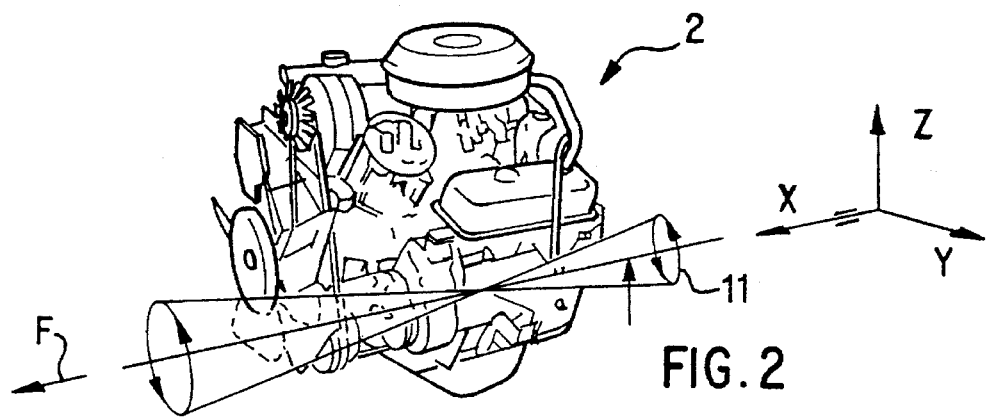
FIGS. 2 to 4 are representations of embodiments of the engine with its essential main excitation directions.
Figure 3:
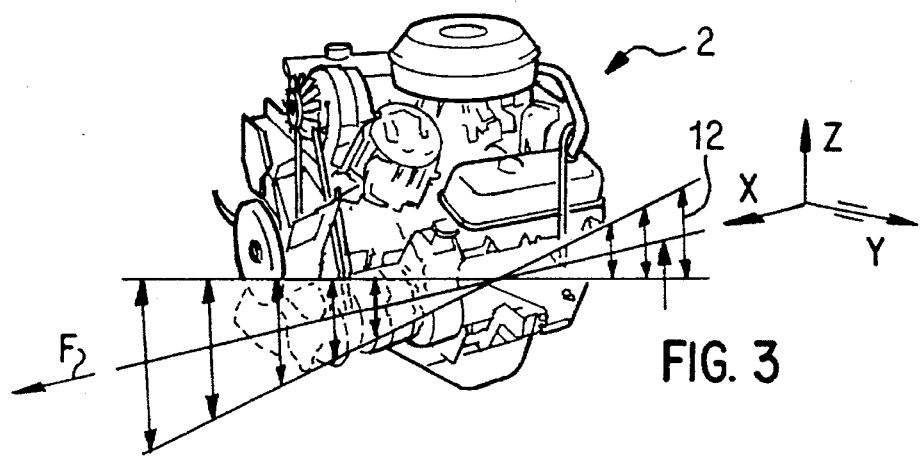
Figure 4:
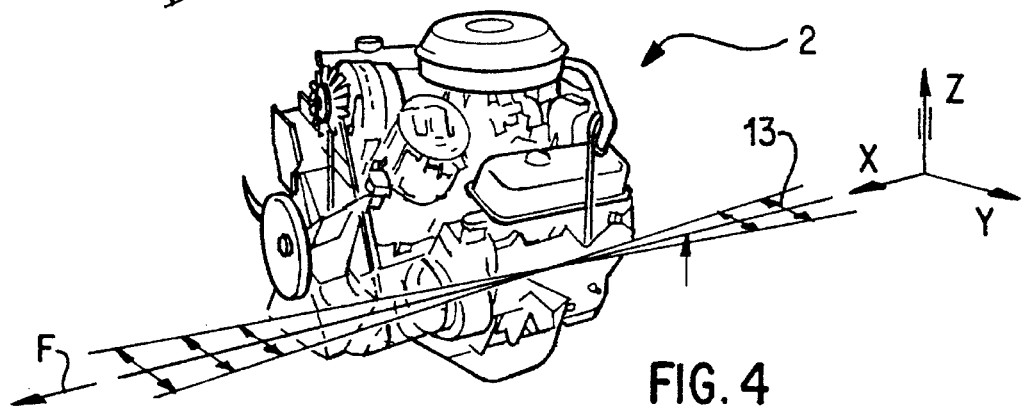

FIGS. 2 to 4 show the engine 2 with its main excitation directions. These may occur in the case of any structural shape of the engine. In FIG. 2, the main excitation direction of the engine 2 is illustrated in a circular manner in the direction of the arrow 11; in FIG. 3, the main excitation direction is illustrated in the vertical Z-direction (direction of arrow 12); and in FIG. 4, the main excitation direction is shown in the transverse Y-direction (direction of arrow 13).

In order to be able to take into account these essential main excitation directions, the uncoupling device 5 may be designed and coordinated correspondingly so that two vibration systems A and B are formed which react by way of the joint, specifically of the engine 1 and of the remaining assembly, consisting of the transmission 3 with the connected central support tube 4.

Figure 5:
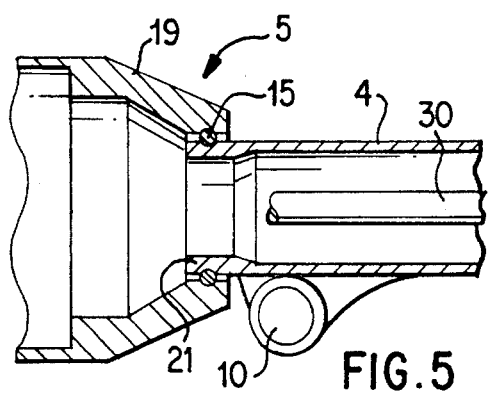
FIG. 5 is a view of an O-seal as the uncoupling device.
Figure 6:
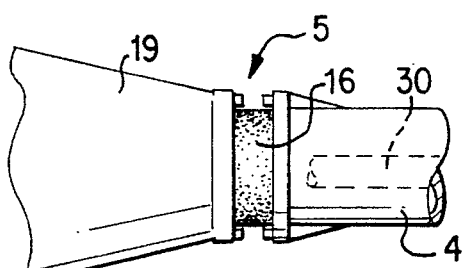
FIG. 6 is a view of an elastomer disk as the uncoupling device.

The uncoupling device 5 may consist, for example, of an O-seal 15 (FIG. 5), of an elastomer preform 16 (FIG. 8), or of a flexible disk 17 (FIG. 7), or of a connecting joint 72; 73; 74 constructed as a spherical plain bearing.

The joint which acts as the uncoupling device 5 is adapted according to the main excitation direction of the engine 2, as indicated in detail in FIGS. 3 and 4. Thus, in the case of a main excitation in the vertical direction 12, a movement becomes possible about a Y-bearing axis of the joint, and in the case of a main excitation in the transverse direction 13, a movement of the engine 2 is possible about a Z-bearing axis of the joint. In other directions, only an insignificant movement of the engine takes place. In the case of superimposed movements of the engine 2 about a Y-bearing axis as well as about a Z-bearing axis, the joint 14 offers a sufficient possibility of carrying out also these movements in both planes in an uncoupled manner with respect to the remaining assembly 3 and 4 and nevertheless transmit torsional torques whereby an overall assembly is ensured which has a small number of bearing points in the vehicle.

In the case of a torsionally soft uncoupling of the engine, a vehicle-body-side support by way of two bearings arranged on a console is required for the supporting of the engine driving torques in the area of the transmission.

The O-seal 15 is arranged between the free end 27 of the central support tube 4 and the neck 19 of the engine power block and holds the central support tube in the power block of the engine 2 in a clamping manner.

Figure 7:
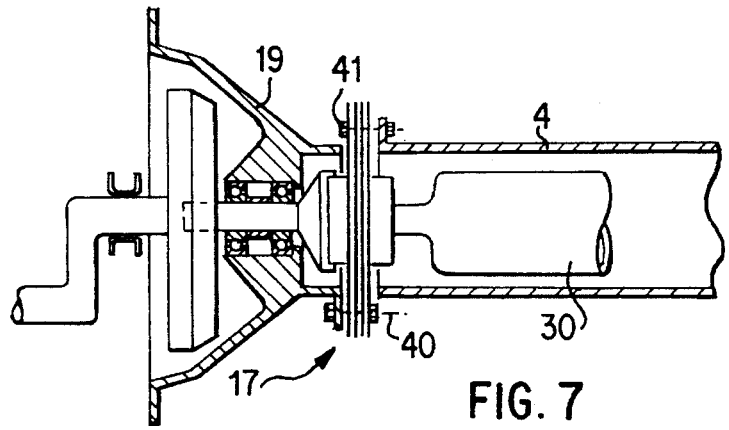
FIG. 7 is a view of a flexible disk or a steel disk bundle as the uncoupling device.
Figure 8:
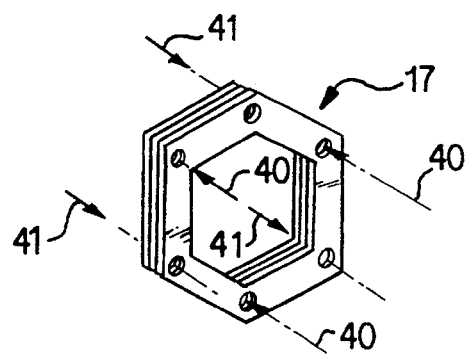
FIG. 8 is a top view of the flexible disk according to FIG. 9.
Figure 9:
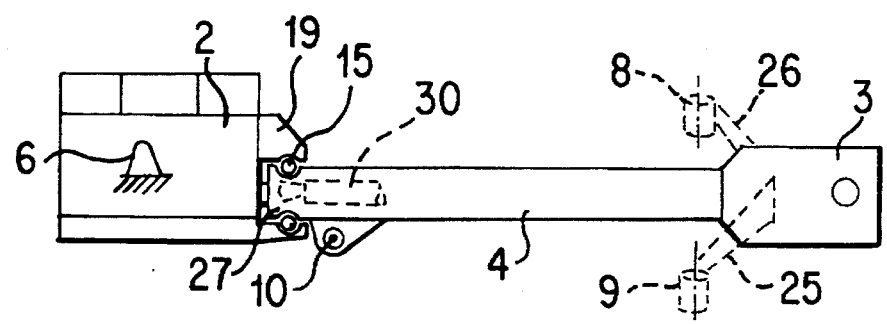
FIG. 9 is a lateral view of the drive assembly comprising an O-seal constructed as the uncoupling device and comprising a transmission-side torque support.

In the case of the embodiment according to FIGS. 7 and 8, a flexible steel disk bundle 17 is fixed, on the one side, on the neck 19 of the power block and, on the other side, on the free end of the central support tube 4. As illustrated in detail in FIG. 7, the screws 41 are connected with the central support tube 5, and the screws 40 are connected with the clutch housing 19.

The uncoupling device 5 consists of a connecting joint 72; 73; 74 of various designs constructed as a spherical plain bearing. The joint 72 comprises an inner ring 51 and an outer ring 52 which permit angular movements between the forward engine 2 with the clutch housing 50 and the central support tube. They each have arched slide faces, the slide face 53 of the inner ring 51 being arched toward the outside, and the slide face 54 of the outer ring 52 being correspondingly arched toward the inside. The archings are preferably designed as circular-arc sections.

The inner ring 51 of the device 5 is connected with the central support tube 4, in which case the fitted-on outer ring 52 is fastened by way of screws 55 to the clutch housing 50 which, in turn, is connected with the engine power section, which is not shown in detail.

Various constructions of the connecting joint are possible with respect to the fastening of the inner ring 51 to the central support tube 4 and the fastening of the outer ring 52 to the clutch housing 50.

Figure 16:
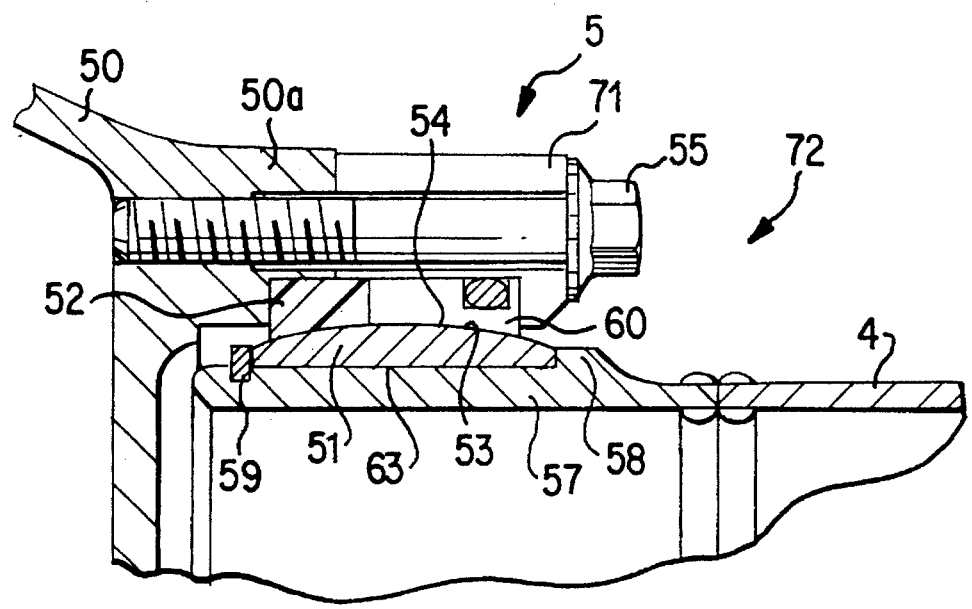
FIG. 16 is an enlarged representation of the connecting joint according to FIG. 3 with the tensioning ring.

Thus, in the case of the construction of the connecting joint 72 according to FIG. 16, the inner ring 51 is held in a braced manner in a receiving device 63 of a tube part 57 between a ring projection 58 and a locking ring 59. The tube part 57 is arranged as a lengthening of the central support tube 4 and is fixedly connected with it.

The outer ring 52 is held between the clutch housing 50 and a tensioning ring 71 which reaches over it on the face side as well as on the circumference.

For fitting the outer ring 52 over the inner ring 51, the outer ring 52 is provided with longitudinal slots 60 which are arranged to be distributed along the circumference and extend approximately along half the length of the ring 52.

Figure 17:
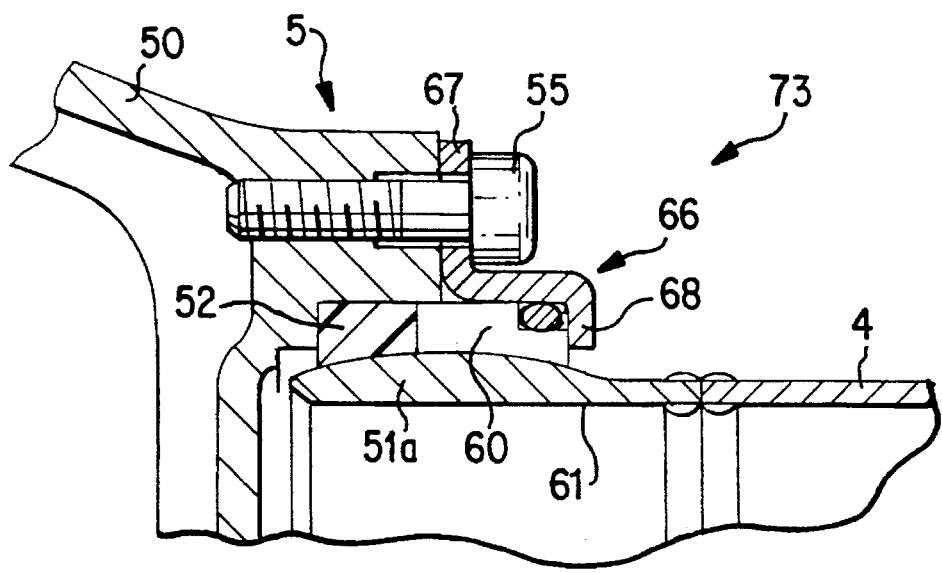
FIG. 17 is a view of a variant of the embodiment of the connecting joint with an inner ring of the joint joined to the central support tube.

According to another construction of the uncoupling device 5 according to FIG. 17 with the connecting joint 73, the inner ring 51a is molded to a tube piece 61 and or worked into a tube piece 61 which is fixedly connected, for example, with the central support tube 4 by means of a welding.

Figure 18:
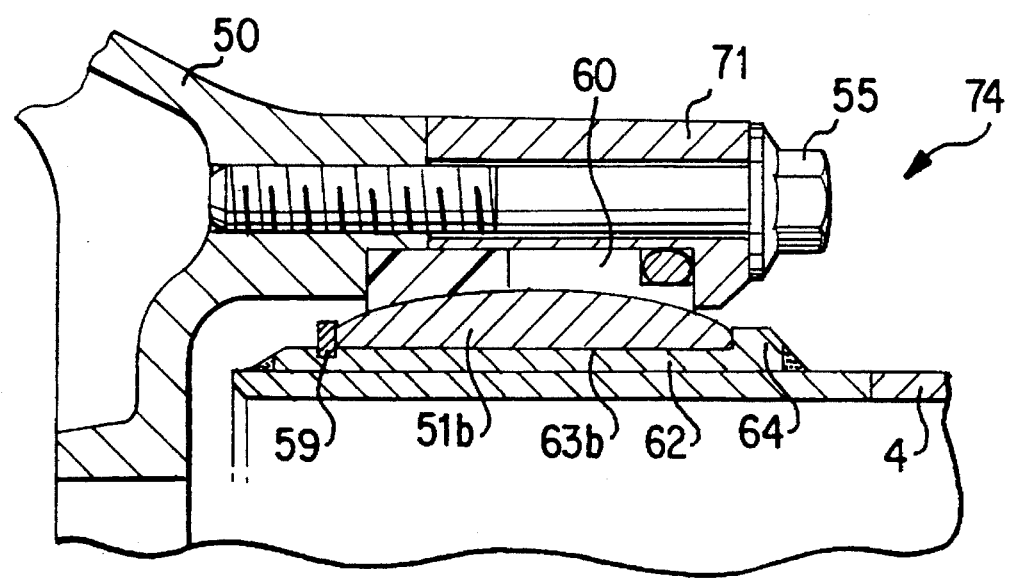
FIG. 18 is a view of a variant of the embodiment of the connecting joint with an inner ring placed on the central support tube.

According to the construction of the uncoupling device 5 with the connecting joint 74 according to FIG. 18, the inner ring 51b is held on a sleeve 62 which is fixedly connected with the central support tube 4. The sleeve 62 comprises a receiving device 63b which, on one end, has a ring projection 64 on which the ring 51b is supported on the face-side. At the opposite end, the ring 51b is held by way of a lock ring 59. As illustrated in detail in FIGS. 16 and 18, the connection of the outer ring 52 with the clutch housing 50 may take place by way of the tensioning ring 71 or by way of a bent structural element 66. One leg 67 of the element is supported on the housing 50, and the other leg 68 reaches over the face of the outer ring 52. By means of screws 55, the structural element 66 is fixed to the clutch housing 50.

Directly adjacent to the uncoupling device 5, the central support tube 4 is supported by way of a bearing 10 with respect to the vehicle body. This bearing has a defined characteristic, in which case it is designed to be softer in the vertical direction 69 and in the transverse direction than in the longitudinal direction 70. Furthermore, it is arranged on the transmission by means of a relatively large base b with respect to the bearing 7.

The torque-transmitting joint 77 is constructed as a cardan joint which has a clutch shaft 75 connected with a fork-shaped piece 76, which clutch shaft 75 is connected with respect to the drive by way of a toothing 81 in the neck of the fork-shaped piece. A fastening takes place by way of a clamping sleeve 78. After the clamping sleeve is released—which takes place from the outside through an opening closed off by a cover 82—the clutch shaft 75 can be shifted from the driving position C in the direction of the arrow into the repair position D, for the purpose of which the joint 77 has a centric opening 79. By means of this axial displaceability of the clutch shaft 77 in a central shaft tube 80, a simple and fast exchangeability of the clutch is provided.

The bearings 6 of the engine 2 and the bearings 7 or 8 and 9 of the transmission are each arranged in low-vibration zones of the drive assembly 1. For achieving a large supporting base b between the bearing 7 or the bearings 8 and 9 and the bearing 10 on the central support tube 4, this tube 4 is moved as far as possible to the engine power block, the uncoupling device 5 also adjoining as closely as possible to the engine power block. This is required in order to avoid large rocking motions on the uncoupling device 5 when the engine 2 moves.

Figure 10:
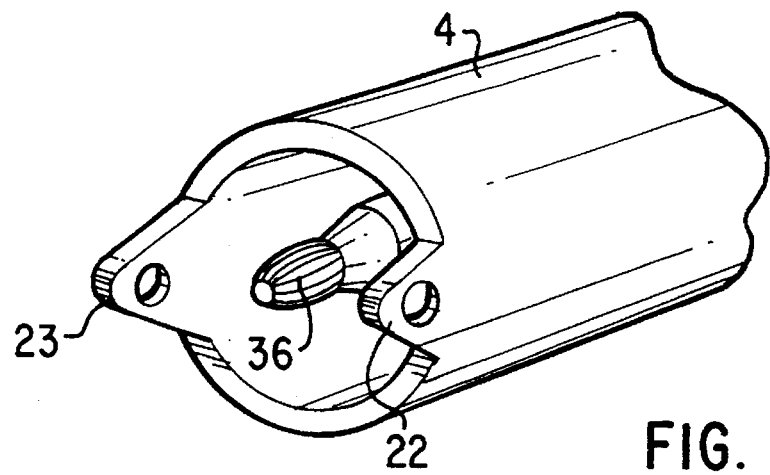
FIG. 10 is a representation of a free end of the drive shaft with a spiral toothing.
Figure 11:
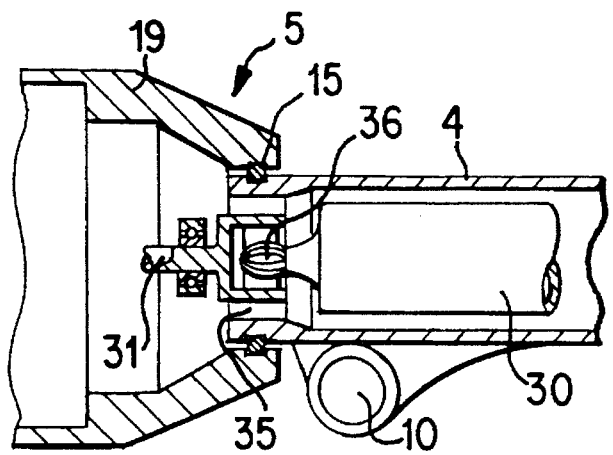
FIG. 11 is a diagrammatic representation of a connection between a drive shaft and an engine-side output shaft.
Figure 12:
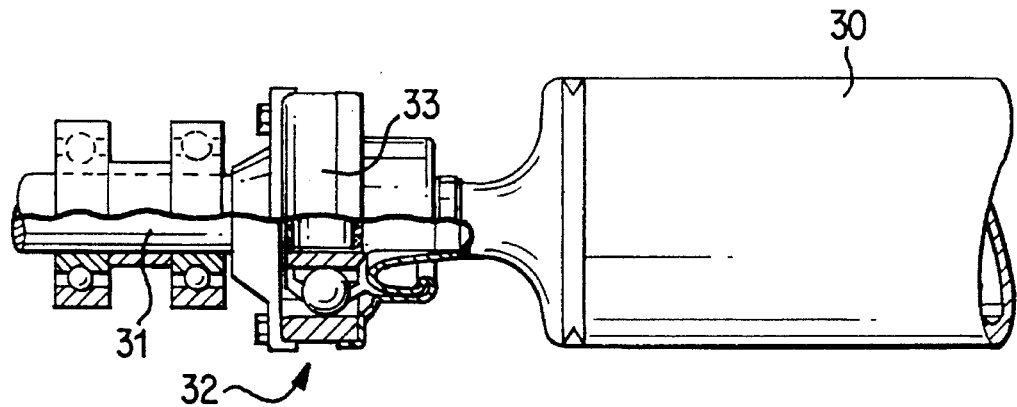
FIG. 12 is a view of a connection between the drive shaft and the output shaft by way of a constant-velocity joint.
Figure 13:
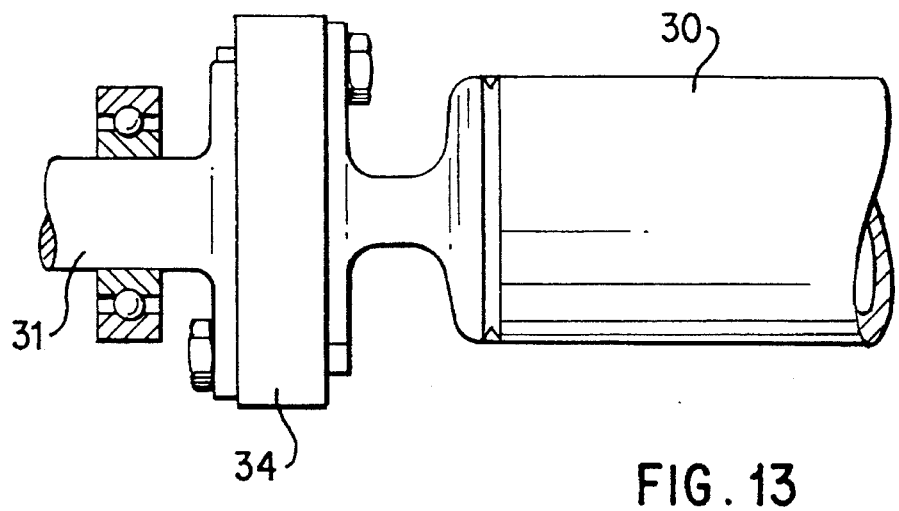
FIG. 13 is a connection between the drive shaft and the output shaft by way of an elastomer disk.

As shown in detail in FIGS. 12 and 13, a drive shaft 30 arranged in the central support tube 4 is connected with respect to the drive with an engine-side output shaft 31 by way of an articulated connection 32 which may consist, for example, of a constant-velocity joint 33, of an elastomer disk 34 or of a toothed connection 35. On the free end of the drive shaft 30, this toothed connection comprises a spiral toothing 36 which engages in a corresponding toothing in a sleeve 37 of the output shaft 31 (FIG. 10).

Figure 14:
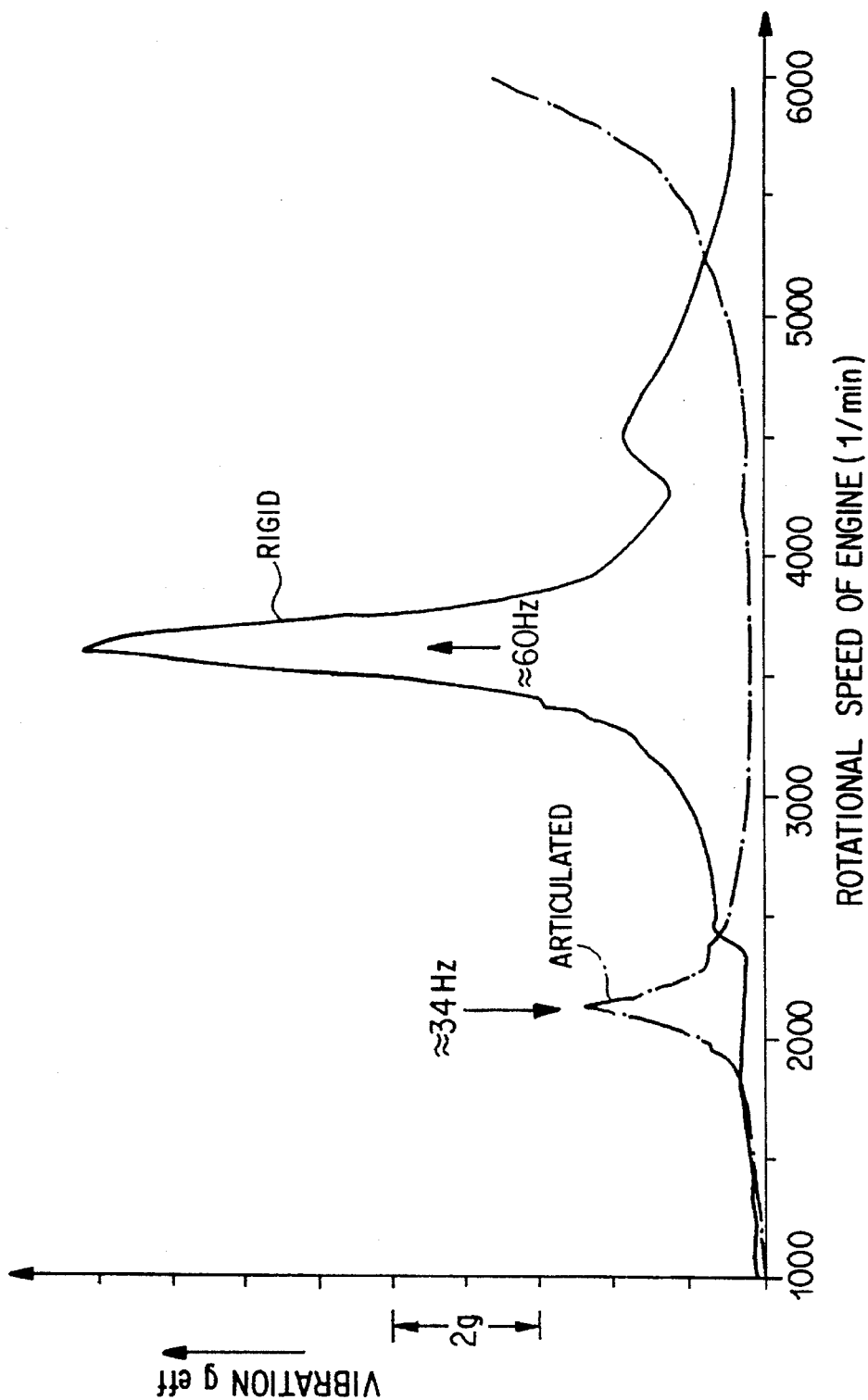
FIG. 14 is a diagram of the representation concerning the noise reduction of a central support tube held in an articulated manner in comparison to a tube connected in a rigid manner.
Figure 15:
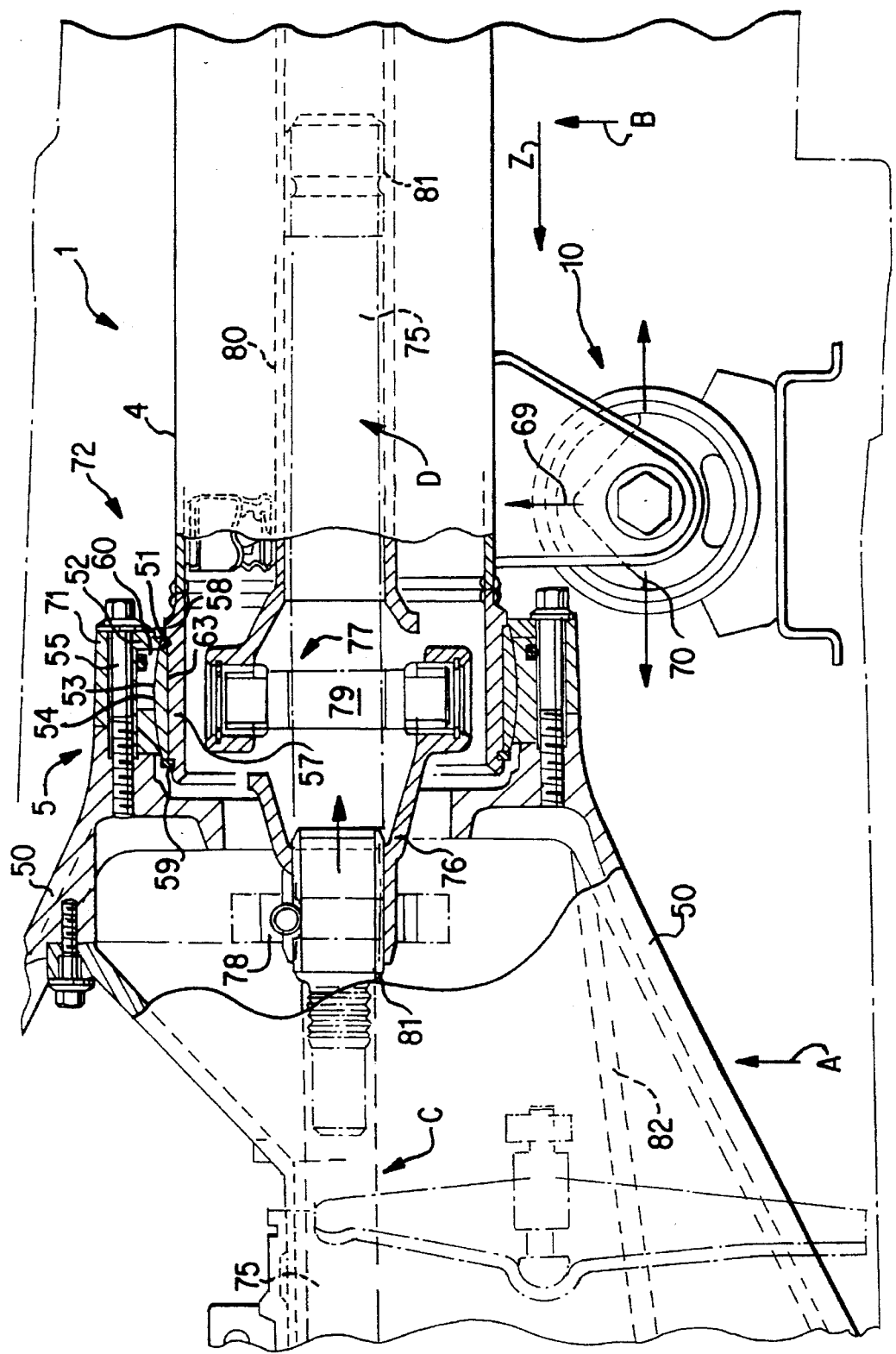
FIG. 15 is a representation of the connecting joint between the central support tube and the engine which is constructed as a spherical plain bearing.

FIG. 14 shows in a diagram, in which the amount of vibration is entered above the rotational speed, that a central support tube 4 which is connected to the engine power block in an articulated manner has a vibration of a significantly lower frequency than a central support tube 4 which is rigidly connected with the engine power block.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A drive assembly for a motor vehicle having a vehicle body, comprising:

a forward engine supported in engine support bearings on a vehicle body, so as to be movable in respective vibration excited vertical and horizontal directions, a rearward drive unit supported at said vehicle body by at least one elastic drive unit support bearing, a central support tube extending between the drive unit and the engine, said support tube being rigidly connected with the drive unit and being movably connected with the engine by way of a flexible tube connection joint, and a drive shaft extending inside the support tube between an engine output shaft and the drive unit, said drive shaft and engine output shaft being drivingly connected by a torque-transmitting joint located at and inside the flexible tube connection joint, wherein the torque transmitting joint and flexible tube connection joint provide for vibration uncoupling of the engine and drive unit by elastically supporting relative angular movement of the engine and support tube in respective vertical and horizontal vibration excitation directions of movement of the engine with respect to the drive unit; and wherein the flexible tube connecting joint comprises a flexible disk bundle arranged between a neck of an engine power block and a face of the central support tube, said flexible disk bundle being connected by way of separate fastening points with the central support tube and with the neck of the engine power block.

2. A drive assembly according to claim 1, wherein the engine support bearings include a pair of bearings, one each at opposite lateral sides of the engine, and wherein the drive unit support bearing includes a single bearing located in an axis of symmetry of the drive unit.

3. A drive assembly according to claim 1, wherein the drive unit is connected with transversely situated consoles, each console having a bearing at an end side for providing torque support with respect to the vehicle body.

4. A drive assembly according to claim 1, wherein the drive shaft has a spiral toothing on its free end which engages in a corresponding toothing in a sleeve of the engine output shaft to form the torque transmitting joint.

5. A drive assembly according to claim 1, wherein said separate fastening points include a plurality of threaded fasteners disposed circumferentially around the disk bundle, alternate ones of said fasteners being connected respectively to the support tube and neck of the engine power block.

6. A drive assembly according to claim 1, wherein the drive shaft has a spiral toothing on its free end which engages in a corresponding toothing in a sleeve of the engine output shaft to form the torque transmitting joint.

7. A drive assembly according to claim 1, wherein the central support tube is supported adjacent to the connecting joint by an elastic bearing which is constructed with a softer characteristic in the vertical direction and transverse direction than in the longitudinal direction.

8. A drive assembly according to claim 1, wherein the engine output shaft is connected with the drive shaft by a constant-velocity joint forming the torque transmitting joint.

* * * * *